(12) United States Patent
Cronström et al.

(10) Patent No.: US 7,995,513 B2
(45) Date of Patent: Aug. 9, 2011

(54) PORTABLE COMMUNICATION DEVICES AND CONTEXT DEPENDENT MESSAGING

(75) Inventors: David Cronström, Malmö (SE); Hans-Olof Olsson, Blentarp (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1068 days.

(21) Appl. No.: 11/681,459

(22) Filed: Mar. 2, 2007

(65) Prior Publication Data

US 2008/0188205 A1 Aug. 7, 2008

Related U.S. Application Data

(60) Provisional application No. 60/887,907, filed on Feb. 2, 2007.

(51) Int. Cl.
*H04B 7/14* (2006.01)
(52) U.S. Cl. .............. 370/315; 455/466; 455/414.1; 709/206
(58) Field of Classification Search .......... 455/466, 455/414.1; 370/315; 709/206
See application file for complete search history.

(56) References Cited

U.S. PATENT DOCUMENTS

| 2002/0107027 | A1* | 8/2002 | O'Neil | 455/456 |
| 2006/0009155 | A1* | 1/2006 | Paalasmaa et al. | 455/41.2 |
| 2006/0031316 | A1* | 2/2006 | Forstadius | 709/206 |
| 2007/0204285 | A1* | 8/2007 | Louw | 725/14 |
| 2007/0207782 | A1* | 9/2007 | Tran | 455/414.1 |
| 2007/0244983 | A1* | 10/2007 | Berger | 709/217 |

FOREIGN PATENT DOCUMENTS

| KR | 10-0608824 | 7/2006 |
| WO | WO 01/77939 A1 | 10/2001 |
| WO | WO 2005/067328 A1 | 7/2005 |
| WO | WO 2005/078577 A1 | 8/2005 |

OTHER PUBLICATIONS

International Search Report with Written Opinion for corresponding PCT Application No. PCT/EP2007/056074, dated Oct. 11, 2007, 21 pages.

* cited by examiner

*Primary Examiner* — Kamran Afshar
*Assistant Examiner* — Shahriar Behnamian
(74) *Attorney, Agent, or Firm* — Harrity & Harrity, LLP

(57) ABSTRACT

A method for sending a message from a first device to a second communication device via a network includes determining and downloading a background media part via the network to the first device. The background media part may be based on the current status of the first device and may be included as a background part of a message. The method may also include sending the message from the first device to the network arrangement for further transportation to the second communication device.

12 Claims, 4 Drawing Sheets

PORTABLE COMMUNICATION DEVICES AND CONTEXT DEPENDENT MESSAGING

RELATED APPLICATIONS

This application claims priority under 35 U.S.C. §119 based on U.S. Provisional Application Ser. No. 60/887,907, filed Feb. 2, 2007, the disclosure of which is hereby incorporated herein by reference.

TECHNICAL FIELD OF THE INVENTION

Aspects described herein relate to the field of portable communication devices and more particularly, but not limited to, portable communication devices provided with context dependent messaging abilities.

DESCRIPTION OF RELATED ART

Today there is a trend within the field of portable devices to provide the devices with an ever increasing number of functions. In particular, there is a trend of providing portable devices with an increased ability to handle media items, such as, for example, text parts, image parts, audio parts, video parts, etc. A text part may, for example, comprise graphic text or rich text or similar. A sound part may, for example, comprise music or similar. An image part may, for example, comprise photos or similar and a video part may, for example, comprise movies or similar. These media items and similar may be recorded or downloaded by the portable device, or provided to the portable device in any other suitable manner, such as by means of detachable storage devices such as memory cards or memory sticks, etc.

As portable devices have become more complex and more like stationary devices the need for exchanging media items between different devices has become increasingly interesting and necessary. In this light, various techniques have been developed for exchanging media messages and the like between devices.

One technique of this kind is the Multimedia Messaging Service (MMS), which is a standard for transmitting multimedia messages between terminals in telecommunication networks. A MMS message may, for example, include parts such as text, an image, an audio or video part or similar media items as described above. The MMS standard is mainly deployed in cellular telecommunication networks and its main standardization effort is done by the $3^{rd}$ Generation Partnership Project (3GPP). Naturally, there are other techniques for sending a message, such as an SMS, an e-mail message, etc.

A MMS message may, for example, comprise a text part that is combined with an image part and/or an audio part or some other media part. A MMS message may alternatively comprise a text part combined with a video part and/or an audio part or some other media part. Similarly, a MMS message may comprise an audio part combined with an image part or a video part or some other media part. Naturally, many other combinations are conceivable.

The combination of different media parts in MMS messages and similar messages are typically composed by the user of the transmitting terminal. It follows that the specific combination of the media parts in a message is in essence determined by the user.

This provides a rather closed and one sided way of composing messages. For example, the messages will not be composed by media parts that are currently unknown to the user. Similarly the messages will not be composed based on events or similar that are currently unknown to the user. Moreover, the mind of one user is typically different from the mind of other users.

It is therefore difficult if not impossible to achieve any uniformity between messages that are sent by different users. Hence there is no way of providing at least partly uniform messages from different users to their respective receivers. A need for transmitting at least partly uniform messages to individuals in a large population may, for example, arise in case of accidents and traffic jams etc. In such cases, it would be beneficial to include substantially uniform information as a part of MMS messages or similar messages sent by different users.

In the same or similar way, there is no easy way of dynamically and uniformly providing suitable advertisements and other commercials in messages sent by different users to individuals that share some common quality, such as being located in the same area or having certain properties associated with their subscription (e.g. phone subscription in case of a portable device in the form of a cell phone) etc. The presence of commercials or similar in messages can, for example, be used to differentiate and/or reduce the fees that are charged for sending the messages, at least to the extent the commercial is paid by an advertiser or similar. This has the potential of increasing the number of messages transmitted in the network in question, which in turn has the potential of increasing the revenues for network operators etc.

In view of the above it would be advantageous to provide an improved method for supporting users of portable devices in composing a message to be sent by the device, which method has the potential of providing at least partly uniform messages from different users. It would also be advantageous to provide a device for performing the improved method.

SUMMARY OF THE INVENTION

Aspects described herein relate to supporting users of portable communication devices in composing a message to be sent by the device, which can provide at least partly uniform messages from different users.

One implementation is directed to providing an improvement for supporting users of portable devices in composing a message to be sent by the device, which can provide at least partly uniform messages from different users.

According to one aspect, a method for sending a message from a first wireless and portable communication device to a second communication device via a network arrangement is provided. The first device comprises a communication arrangement for operatively communicating messages with the network arrangement, and a message control unit for operatively performing said method. The communication arrangement may comprise, for example, a radio unit for enabling radio communication with said network arrangement, an event handler for handling such events as outgoing and incoming communication to and from the network arrangement, and a control unit for controlling the other units in the communication arrangement.

The method may comprise the steps of: determining and downloading a background media part from the network arrangement to the first device depending on the current status of the first device, including the background media part as a background part of a message in the first device, sending the message from the first device to the network arrangement for a further transportation to the second device.

The method provides the advantage of supporting users of portable devices in composing messages to be sent by the device. In particular, the method can be used for providing at least partly uniform messages from different users.

A second aspect is directed to a method including the steps of the first aspect and characterized by the steps of determining and downloading a background media part from the network arrangement to the first device depending on the geographical position of the first device.

A third aspect is directed to a method including the steps of the first aspect and characterized by the steps of determining and downloading a background media part from the network arrangement to the first device depending on the geographical position of the second device.

A fourth aspect is directed to a method including the steps of the first aspect and characterized by the steps of determining and downloading a background media part from the network arrangement to the first device depending on the character of a message to be sent by the first device.

A fifth aspect is directed to a method including the steps of the fourth aspect and characterized by the steps of determining and downloading a background media part from the network arrangement to the first device depending on the content of a message to be sent by the first device.

A sixth aspect is directed to a method including the steps of the first aspect and characterized by the steps of determining and downloading a background media part from the network arrangement to the first device by: transmitting a request from the first device to the network arrangement, wherein the content of the request depends on the current status of the first device; and receiving a background media part from the network arrangement, wherein the background media part is selected depending on the current status of the first device.

A seventh aspect is directed to a method including the steps of the sixth aspect and characterized by the steps of transmitting a request from the first device to the network arrangement by: proposing a plurality of requests to a user of the first device, wherein the content of the requests depend on the current status of the first device, receiving a selection of a presented request from the user, and transmitting the selected request to the network arrangement.

According to an eight aspect, a portable communication device for sending a message to another communication device via a network arrangement is provided. The portable device comprises a communication arrangement for operatively communicating messages with said communication network arrangement and a message control unit for operatively: determine and download a background media part from said network arrangement to said first device depending on the current status of the portable device, include said background media part as a background part of a message in the portable device, and send the message from the portable device to the network arrangement for a further transportation to said other device.

A ninth aspect is directed to a portable device including the features of the eight aspect and characterized by the message control unit being arranged to operatively: determine and download a background media part from said network arrangement to said first device depending on the geographical position of said first device.

A tenth aspect is directed to a portable device including the features of the eight aspect and characterized by the message control unit being arranged to operatively: determine and download a background media part from said network arrangement to said first device depending on the geographical position of said second device.

An eleventh aspect is directed to a portable device including the features of the eight aspect and characterized by the message control unit being arranged to operatively determine and download a background media part from said network arrangement to said first device depending on the character of a message to be sent by said first device.

A twelfth aspect is directed to a portable device including the features of the eight aspect and characterized by the message control unit being arranged to operatively determine and download a background media part from said network arrangement to said first device depending on the content of a message to be sent by said first device, A thirteenth aspect is directed to a portable device including the features of the eight aspect and characterized by the message control unit being arranged to determining and downloading a background media part from the network arrangement to said first device by operatively: transmit a request from the first device to the network arrangement, where the content of the request depends on the current status of the first device; and receive a background media part from the network arrangement, where the background media part is selected depending on the current status of the first device.

A fourteenth aspect is directed to a portable device including the features of the thirteenth aspect and characterized by the message control unit being arranged to transmit a request from the first device to the network arrangement by operatively: propose a plurality of requests to a user of the first device, where the content of the requests depend on the current status of the first device; receive a selection of a presented request from the user, and transmit the selected request to the network arrangement.

A fifteenth aspect is characterized by a computer program product stored on a computer usable medium, comprising readable program means for causing a portable device to execute, when said program means is loaded in the portable device comprising: a communication arrangement for operatively communicating messages with a communication network arrangement; and a message control unit, the steps of: determining and downloading a background media part from the network arrangement to the first device depending on the current status of the first device, including said background media part as a background part of a message in the first device, and sending the message from the first device to the network arrangement for a further transportation to a second device.

A sixteenth aspect of the invention is characterized by a computer program element having a program recorded thereon, where the program is to make a portable device to execute, when said program means is loaded in the portable device comprising: a communication arrangement for operatively communicating messages with a communication network arrangement; and a message control unit, the steps of: determining and downloading a background media part from the network arrangement to the first device depending on the current status of the first device, including said background media part as a background part of a message in the first device, and sending the message from the first device to the network arrangement for a further transportation to a second device.

Further advantages of the present invention and embodiments thereof will appear from the following detailed description of the invention.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that various steps in the methods described herein may be performed in different sequences without departing from the present invention.

BRIEF DESCRIPTION OF THE DRAWINGS

The present invention will now be described in more detail with reference to the enclosed drawings, in which.

DETAILED DESCRIPTION OF EMBODIMENTS

Figure 1:
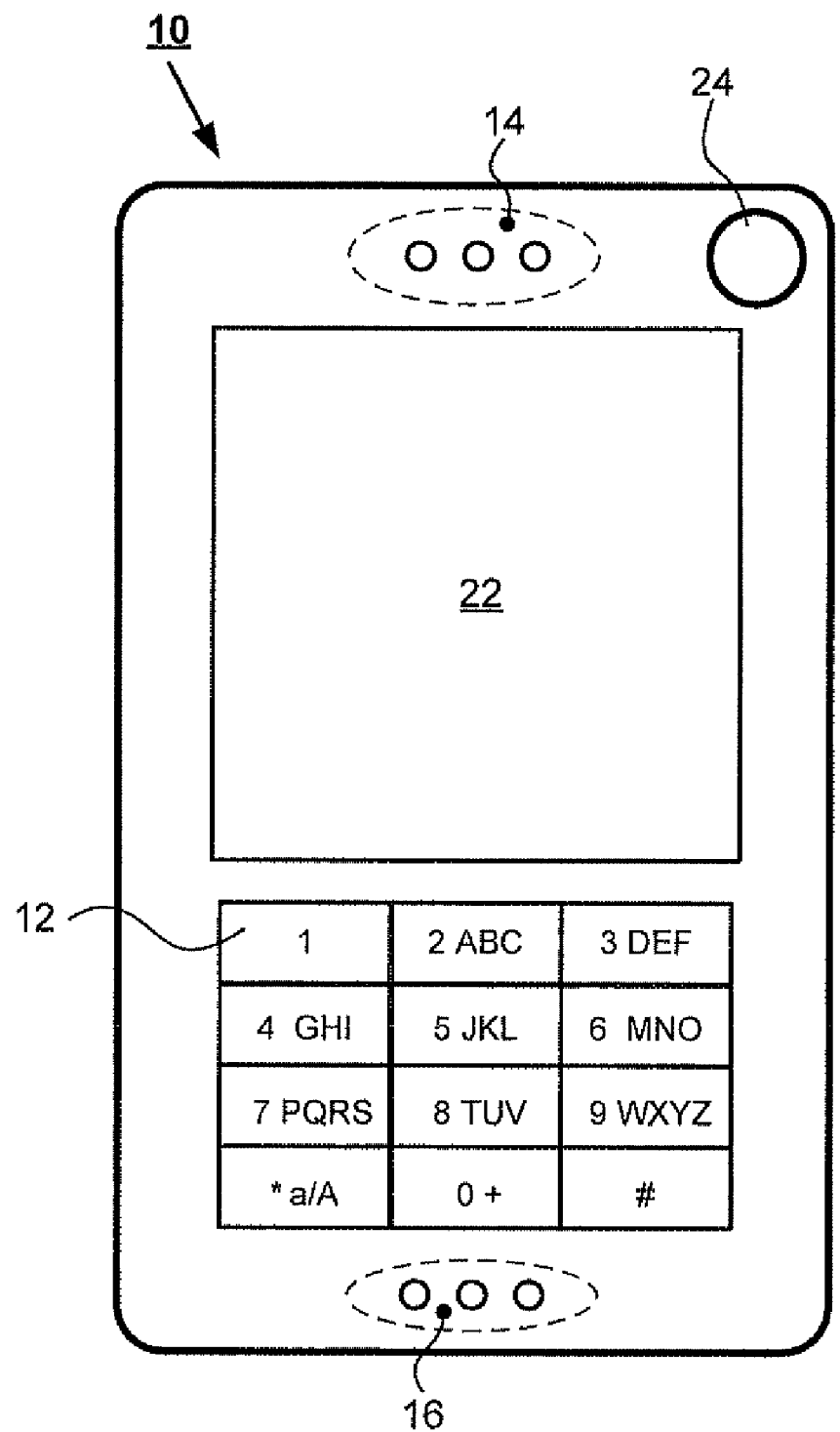
FIG. 1 shows a schematic view of an exemplary portable communication device in the form of a MMS enabled cell phone.

FIG. 1 shows a portable communication device 10 according to a preferred embodiment of the present invention. The portable device 10 is preferably a mobile cellular phone adapted to operate according to 3G-technology (e.g., W-CDMA or CDMA2000) or possibly according to 2.5-technology (e.g., GPRS) or similar technology. Information about 3G-technology and 2.5-technology etc. can, for example, be found in specifications from the $3^{rd}$ Generation Partnership Project (3GPP), see the web-site at www.3gpp.org. Further developments have produced similar techniques for enabling even higher data transfer speeds. For example, the so-called High-Speed Downlink Packet Access (HSDPA) has been developed as an evolution of the 3G technologies. Other examples of similar techniques is the so-called WiFi technology substantially based on the IEEE 802.11 specifications and the WiMAX technology substantially based on the IEEE 802.16 specifications. Naturally, such techniques can be advantageously utilized in connection with embodiments of the present invention.

The cell phone 10 shown in FIG. 1 is provided with a keypad 12, a loudspeaker 14 and a microphone 16. The keypad 12 is used for entering information, such as selecting functions and responding to prompts. The keypad 12 may be of any suitable kind, including but not limited to keypads with push-buttons as well as touch-buttons and/or a combination of different suitable button arrangements. The loudspeaker 14 is used for presenting sounds to the user and the microphone 16 is used for sensing the voice from a user. In addition, the cell phone 10 includes an antenna to be used for communication with other users via a network. However the antenna may be built-in into the phone 10 and hence is not shown in FIG. 1. The cell phone 10 also comprises a display 22 for presenting functions, prompts, etc. to a user of the phone 10. Moreover, the cell phone 10 comprises a camera arrangement 24 for enabling images to be digitally recorded by the phone 10. It is preferred that the camera arrangement 24 comprises a lens and/or a lens system and an image sensor such as a CCD (Charged Couple Device) or similar. The display 22 may be utilized for presenting images recorded by the camera arrangement 24.

It should be emphasized that the cell phone 10 in FIG. 1 is just one example of a wireless portable device in which the invention can be implemented. The invention can, for instance, also be used in a PDA (personal digital assistant), a palm top computer, a lap top computer or a smartphone or any other suitable portable device, such as any portable device with communication capabilities.

Figure 2:
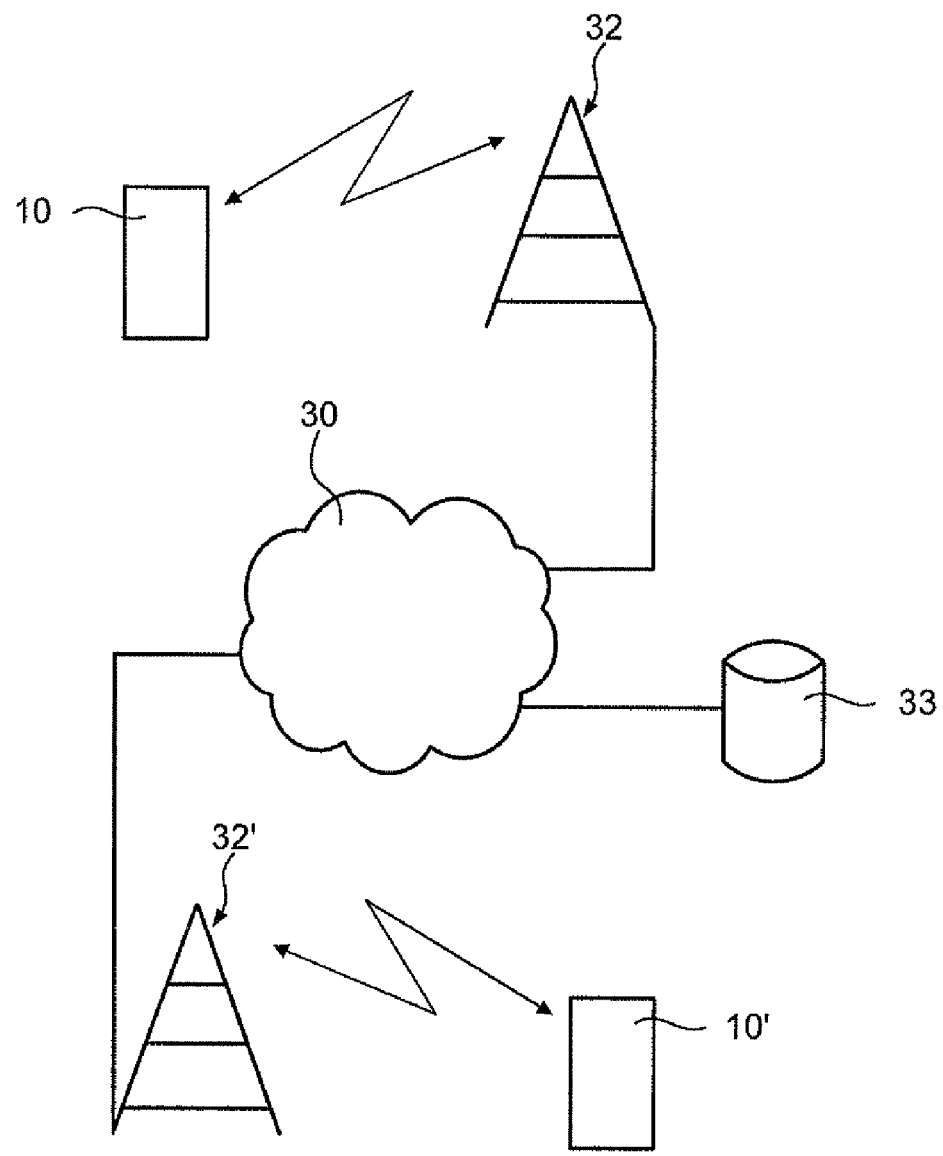
FIG. 2 shows the cell phone in FIG. 1 connected to a cellular network.

FIG. 2 shows the cell phone 10 connected to a cellular network 30 via a first base station 32. The network 30 may be a GPRS network, or any other 2.5G or 2.75G network. However, it is preferred that the network is a 3G network such as a WCDMA network or similar. In addition, FIG. 2 shows a second cell phone 10' connected to the same cellular network via a second base station 32'. The first cell phone 10 is arranged to operatively send a MMS message to the second cell phone 10' via the first base station 32, the network 30 and the second base station 32'.

It is preferred that the network 30 provides information about the current geographical position of the cell phones 10, 10', e.g., by providing or sharing information about the base stations 32, 32' among a plurality of base stations in the network 30 that are currently serving the cell phones 10, 10'. Typically, the base station 32 and 32' are separate base stations. However, in some situations it may be the same base station. In addition, more sophisticated networks may comprise tracking functions which, for example, use triangulation by means of a plurality of base stations for tracking the position of a cell phone.

The functions of the network 30, the base stations 32, 32' and the cell phones 10, 10' as described above are well known to those skilled in the art. In particular, sending a MMS message from one cell phone 10 to another cell phone 10' via a cellular network is a well known and frequently utilized function that has been commercially available for several years. Hence, there is no need for a more detailed description of the underlying technology for sending a MMS message.

As can be seen in FIG. 2 it is preferred that the network 30 is connected to or includes a server 33. The server 33 is preferably provided with background media parts arranged to be operatively downloaded to the cell phone 10 when requested. The background media parts may, for example, be downloaded upon a request from the cell phone 10 via the network 30. A request from, for example, the cell phone 10 may include information and or instructions for the selection of the media part to be downloaded to the cell phone 10. The selection of a media part based on such instructions is preferably determined by the current status of the cell phone 10 and performed by the server 33 and/or an application running on the server 33. A download of media parts to a cell phone from a server is well known per se and it needs no further description.

The server 33 may be any well known server, such as a server connected to the Internet which in turn is connected to the network 30, which enables the server 33 to provide services to the cell phone 10. This is a well known configuration in connection with, for example, GPRS networks and 3G networks. Together the network 30 and the server 33 form a network arrangement. It should be understood that the network arrangement may include any further network that may be arranged between the network 30 and the server 33, such as the Internet or similar.

Figure 3:
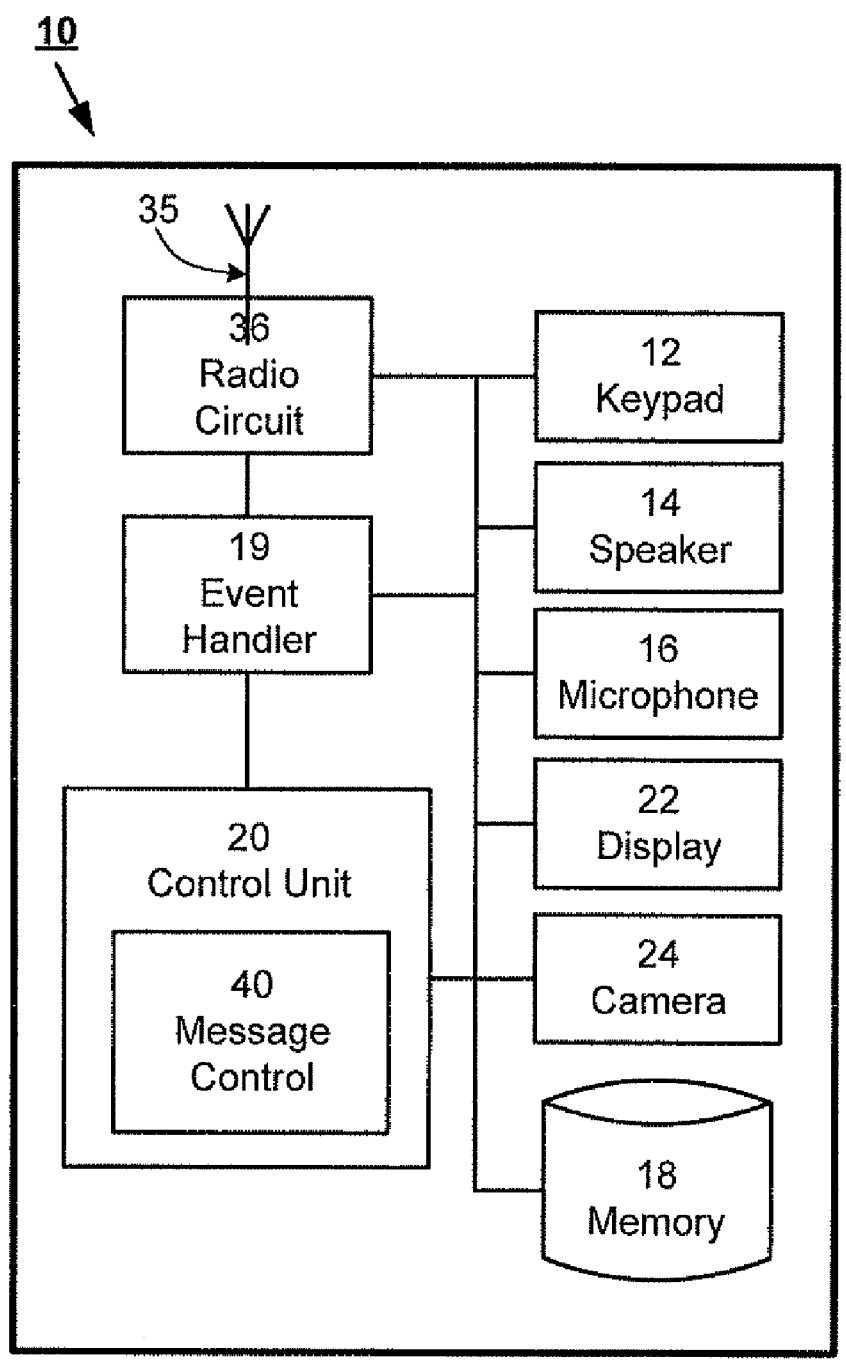
FIG. 3 shows a schematic illustration of the parts of the cell phone in FIG. 1-2.

FIG. 3 shows parts of the interior of the exemplary cell phone 10. It should be understood that cell phone 10 may include additional and/or different components. As previously explained, it is preferred that the cell phone 10 comprises a keypad 12, a speaker 14, a microphone 16, a display 22 and a camera arrangement 24. It is also preferred that the phone 10 is provided with a memory 18 for storing data files, such as media files comprising media items, such as text, images, audio and video items, etc. that can be used as media parts in a MMS message.

In addition, the cell phone 10 comprises an antenna 35 connected to a radio circuit 36 for enabling radio communication with the network 30 as shown in FIG. 2. The radio circuit 36 is in turn connected to an event handling unit 19 for handling such events as outgoing and incoming communication to and from the network 30.

As can be seen in FIG. 3 the cell phone 10 is also provided with a control unit 20 for controlling and supervising the operation of the phone 10. The control unit 20 may be implemented by means of hardware and/or software and it may include one or several hardware units and/or software modules, such as one or several processor units provided with or having access to the appropriate software and hardware necessary for the functions required by the phone 10 as is well known by those skilled in the art.

It is preferred that the control unit 20 is at least indirectly connected to the keypad 12, the speaker 14, the microphone 16, the memory 18, the event handling unit 19, the display 22, the camera 24 and the radio unit 36. This enables the control unit 20 to control and/or communicate with these units so as to, for example, exchange information and instructions and similar with the units.

Of particular interest in connection with the present invention is the message control unit 40 included in control unit 20. Being a part of the control unit 20 implies that the message control unit 40 may be implemented by means of hardware and/or software and it may comprise one or several hardware units and/or software modules, such as one or several processor units provided with or having access to the software and hardware appropriate for the functions required.

In the embodiment now described, it is preferred that the message control unit 40 comprises a MMS-client or similar arranged to operatively process MMS messages or similar that is communicated between the cell phone 10 and the network 30. It should be emphasized that MMS-clients are known per se and they are commercially available in portable devices such as, for example, the Sony Ericsson 3G-smartphone P990i and in most if not all GPRS and 3G phones available from Sony Ericsson or any other mobile phone vendor. However, it should be emphasized that the message does not have to be a MMS. The environment may, for example, be a chat-session wherein a logo or some other item is presented as a background image.

In particular, the MMS-client according to an embodiment of the present invention is arranged to operatively process a MMS message to be transmitted from the cell phone 10 to another cell phone 10' via the network 30, as schematically illustrated in FIG. 2. Further, it is preferred that the MMS-client be arranged to operatively determine and download a background media part depending on the current status of the portable device 10, and to include the media part as a background media part in a MMS message, and to communicate the MMS message from the portable device 10 to the network 30 for a further transmission to a second device 10' as illustrated in FIG. 2.

Before proceeding, it should be emphasized that in addition to the parts and units of the cell phone that are shown in FIG. 3, there may be further parts and units or similar present in the cell phone 10. The parts and units shown in FIG. 3 may also be connected to more pads and units than those illustrated.

Figure 4:
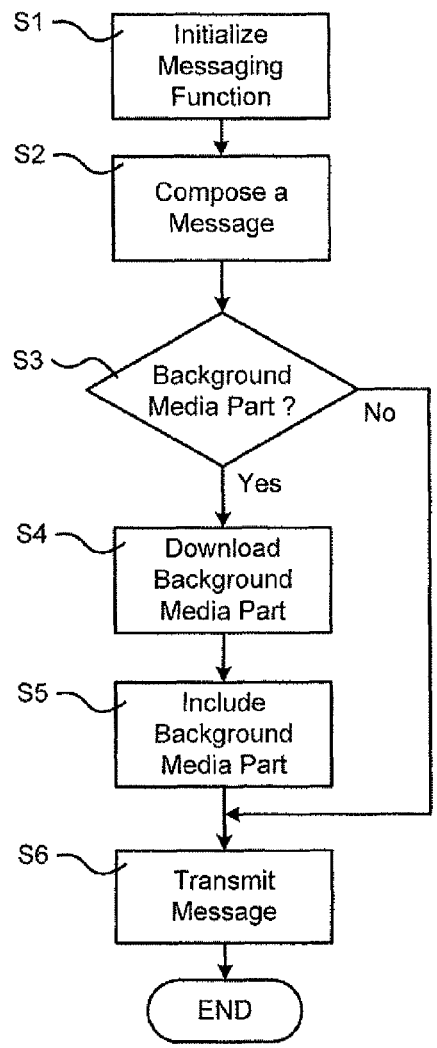
FIG. 4 shows a flowchart illustrating an exemplary method according to an embodiment of the invention.

Attention is now directed to the function of an exemplary embodiment of the present invention. The function will be described with reference to FIG. 1-3 and to FIG. 4 showing a flow chart of a preferred method according an embodiment to the invention.

As previously explained, an exemplary portable device in the form of cellular phone 10 according to an embodiment of the invention is arranged to operatively send a MMS message to a second device 10' via a network arrangement, which includes the communication network 30 without necessarily being limited to the network 30. The portable device 10 comprises a communication arrangement comprising at least on of the event handler 19, the control unit 20, the antenna 35 and the radio circuit 36. The communication arrangement is arranged to operatively communicate MMS messages to and from the network 30 as described above with reference to FIG. 2 and as is well known to those skilled in the art. In addition, the portable device 10 comprises a message control unit 40 that is arranged to at least operatively process said MMS messages before they are transmitted to said network.

The steps in an exemplary method according to an embodiment of the present invention for supporting a user in composing a MMS message to be sent by the cell phone 10 to the cell phone 10' will now be described with reference to the exemplary flow chart in FIG. 4.

The method is preferably performed by message control unit 40, which in case of MMS messages can be advantageously implemented by means of a MMS-client according to an embodiment of the invention.

In a first step S1 of the exemplary method, the MMS messaging function of the cell phone 10 is initialized by initializing the message control unit 40 and the MMS-client. The MMS messaging function may, for example, be initialized by the user pushing a button or a combination of buttons on the keypad 12. An initialization may include actions such as activating the cell phone 10 to present a suitable interface to the user via the display 22 and possibly redefining suitable keys on the keypad 12 for maneuvering the MMS messaging function. The initiation of a MMS messaging function in a cell phone is well known in the art and will not be described further herein.

In a second step S2 of the exemplary method, a MMS message may be composed by means of inputs received from a user of the cell phone 10. The inputs are typically received via the keypad 12 of the cell phone 10 as is well known. A typical input may be, for example, be a letter or a digit in a text part of the MMS message. The input may also relate to other parts of the MMS message, such as the address of the intended receiver of the message, etc. In a typical application the address may, for example, be the phone number of a receiving cell phone, such as the number of the receiving cell phone 10' in FIG. 2.

In a third step S3 it is investigated whether a background media part is required for the MMS message. If no background media part is required, the method may proceed to the sixth step S6 in which the MMS message will be transmitted, as will be described later. However, if a background media part is required the method will proceed to the fourth step S4.

Whether a background media part is required may, for example, be determined by the setting of the phone 10 and/or the MMS-client. The cell phone 10 and/or the MMS-client may be set by one or several oft for example, the manufacturer of the phone 10, the supplier of the phone 10, the user of the phone 10, the operator of the network 30, the operator of the server 33 or a service provider, etc. In addition or alternatively, whether a background media part is required may be determined by the content of MMS message to be sent from the phone 10. In that case, the content of the message is regarded as a part of the setting of the phone 10 and/or the MMS-client.

For example, the cell phone 10 and/or the MMS-client may be set so as to require a background media part for every MMS message to be transmitted by the cell phone 10. Alternatively, the cell phone 10 and/or the MMS client may be set so as to only require a background media part for MMS messages composed without any background media part.

Likewise, the cell phone 10 and/or the MMS-client may be set so as to only require a background media part for MMS messages that includes a certain word or number or a certain combination of words and/or numbers or that include a certain type of media part or other specific content, etc.

In a fourth step S4 of the exemplary method, assume that a background media part is downloaded from the server 33 to the cell phone 10 via the network 30 shown in FIG. 2. The background media part is preferably downloaded when a MMS message has been defined or at least when parts thereof have been defined. However, in some embodiments of the invention the background media part may be downloaded to the cell phone 10 from the server 33 at an earlier occasion so as to be ready for use when a MMS message is eventually defined. In any case, it is preferred that background media parts are downloaded to and/or received from a central server arrangement or the like in the same or similar manner by different message sending devices. This makes it possible to provide uniform background media parts to the different message sending devices.

The content of the background media part may be determined, for example, based on the current geographical position of the transmitting cell phone 10. As described above with reference to FIG. 2, it is well known in the art that the network 30 in the form of, for example, a GPRS-network or a 3G network or similar can provide information about the current geographical position of the cell phones 10, 10'. Hence, the cell phone 10 may, for example, send a request to the network 30 and receive its current geographical position. In addition or alternatively, the cell phone 10 may comprise its own positioning system, such as a GPS-system or similar. The geographical position of the cell phone 10, obtained as indicated above or in some other manner, can be provided as an instruction or similar in a download request transmitted from the cell phone 10 to the server 33 via the network 30. The server 33 and/or an application running on the server 33 may then select a suitable background media part based on the geographical position of the cell phone 10 and download that part to the cell phone 10 via the network 30.

For example, if the cell phone 10 is geographically located in a resort, it may be suitable to select greetings from the resort as a background media part. The greetings may, for example, be sponsored by a local enterprise such as a hotel or similar. The sponsoring can be used to reduce the fees for transmitting the MMS message and the promotion of the resort will be more efficient and/or accurate in that it has a better chance of reaching people knowing that the sender of the message visits the resort and has at least some knowledge about the resort. Naturally, other similar examples for including appropriate background media parts with MMS messages may be used.

If the background media part is an image or includes an image, it may be included as a background watermark upon which the text of the message is presented. In addition, if the background media part includes an audio file or sound, it may be played in the background as the text of the message is presented. Naturally, other combinations of background media parts and other parts in a message are clearly conceivable. In fact, the background media part may be presented as a background watermark, a background sound, as a footnote or as a notice in any other suitable manner to supplement a media part of the same or different kind in a message. In general, a background media part according to embodiments of the present invention may be combined with substantially any other combination of media parts in a message. In addition, the background media part may itself be a combination of different media parts, such as a combination of an image and a sound, or an image and a text, or a sound and a text, or an image combined with both text and sound, etc.

It should be emphasized that the content of the background media part may be determined based on statuses of the cell phone 10 other than its current geographical position. In particular, the background media part may be determined based on the geographical position of the receiving cell phone 10'. The position of the receiving cell phone 10' may, for example, be defined by its phone number, which may be provided by the user in the sending cell phone 10 when composing the MMS message. In this sense, the position of the receiving cell phone 10' is defined by the current status of the sending cell phone 10. That is, the phone number of the receiving cell phone may be a part of the MMS message and hence a part of the status of the cell phone 10 as a whole. As described above with reference to FIG. 2, it is well known in the art that the network 30 can provide information about the current geographical position of the cell phones 10 and 10'. Hence, the cell phone 10 may, for example, send a request comprising the phone number of the receiving phone 10' to the network 30. The network will then be able to identify the receiving cell phone 10' and provide the current geographical position for the receiving cell phone 10' to the sending cell phone 10. The geographical position of the receiving cell phone 10' may in turn be provided as an instruction or similar in a download request transmitted from the sending cell phone 10 to the server 33 via the network 30.

The server 33 and/or an application running on the server 33 may then select a suitable background media part based on the geographical position of the receiving cell phone 10' and download that media part to the sending cell phone 10 via the network 30. For example, if the cell phone 10 is geographically located in a downtown area it may be suitable to select an advertisement as a background media part. The advertisement may be sponsored by, for example, a local business establishment such as a shopping mall or similar. The sponsoring can be used to reduce the fees for transmitting the MMS message and the promotion of the local business establishment will be more efficient and/or accurate in that it will only be received by people that are in the neighborhood or in close proximity to the local business. As another example, the receiving cell phone 10' may be near a traffic jam and/or an accident and it may then be suitable to select a background media part that provides information about the situation in or near the geographical position of the receiving cell phone 10'. This provides the advantage of only informing people in the neighborhood or in close proximity to the event that would most likely need the information the most.

Moreover, the content of the background media part may be determined based on still other statuses of the cell phone 10, such as information associated with the subscription of the cell phone 10. Such information is typically stored in the cellular network 30. The subscription may comprise information about gender, interests, age, marital status, income, etc. Since the behavior associated with the use of the cell phone 10 may depend on the information associated with the subscription, the current status of the subscription is a part of the status of the cell phone 10 as a whole.

In addition, the background media part may be determined based on the character of a MMS in the portable device 10. In particular, it may be preferred that the background media part be determined based on the content of an MMS message. Since the cell phone 10 includes the MMS message, at least before the message is transmitted, the current status of the MMS message including the content of the MMS message is a part of the status of the cell phone 10 as a whole. For example, if the MMS message includes the text "Happy Birthday," the MMS-client may conclude that it is suitable to relate the background media part to a congratulatory item. Similarly, if the MMS message includes the text "Merry Christmas," the MMS-client may conclude that it is suitable to relate the background media part to a Christmas greeting. Such congratulatory messages and greetings and similar messages may of course be combined with sponsored advertisements.

In fact, any information about the character and/or the content of the MMS message extracted by the MMS-client can be provided as an instruction or similar in a download request transmitted from the cell phone 10 to the server 33 via the network 30. The server 33 and/or an application running on the server 33 may then select a suitable background media part based on the received information and download that part to the cell phone 10 via the network 30.

However, in some embodiments of the invention, the background media part may be selected among media parts that have been downloaded to the cell phone 10 from the server 33 at an earlier occasion. However, it is preferred that the background media parts are downloaded or received more or less directly by different message sending devices in the same or similar manner from a central server or the like, since this makes it possible to provide uniform background media parts to the different devices. In still other alternatives, however, the background media parts may be provided by server 33 at a later occasion. That is, server 33 may add the background media parts to the user's message after the user has transmitted the message via network 30. In this case, server 33 may receive the message from cell phone 10 and add the appropriate or selected background media pad.

It should be added that the MMS-client may be arranged to propose one or several requests of which one is to be selected by the user of the cell phone 10 and then sent to the network 30. It is preferred that the character of the proposed requests depend on the current characteristic of the message to be transmitted by the portable device 10. For example, if the MMS-client has established that the MMS message comprises the text "Happy Birthday," the MMS-client may propose one or several addresses to web-pages on the Internet from which the user may download a suitable congratulatory item to be used as a background media part. The user may select one of the proposed addresses which, for example, can be transmitted by the cell phone 10 to the server 33 in the form of a server connected to the Internet. The server 33 and/or an application running thereon may then download a presentation of a web-page to the cell phone 10 in a manner well known in the art and the user of the cell phone 10 may start browsing to select a suitable background media part that is downloaded to the cell phone 10.

In a fifth step S5 of the exemplary method, the downloaded background media item is included as a background part of the MMS message being defined or generated by the user. Including one or several media parts in a MMS message is a procedure that is well to those skilled in the art and will not be described further herein.

In a sixth step S6 of the exemplary method, the MMS message may be transmitted from the cell phone 10 to the network 30 for a further transportation to a receiving cell phone 10' as described above with reference to FIG. 2.

Figure 5:
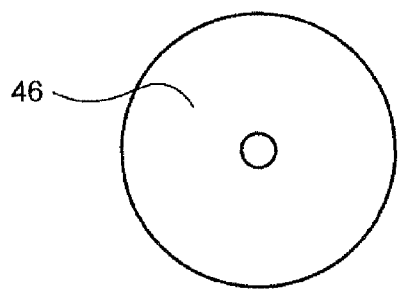
FIG. 5 shows a CD ROM on which program code for executing the method according to embodiments of the invention is provided.

The exemplary method described above is merely an example of the present invention. Other embodiments of the method may comprise more steps or fewer steps and the steps may be executed in another order that the one given above. In general, as previously explained, it is preferred that the message control unit 40 comprises a MMS-client so as to be arranged and able to perform the exemplary method described above. It is preferred that message control unit 40 be provided in the form of one or more processors with corresponding memory containing the appropriate software in the form of a program code. However, the program code can also be provided on a data carrier such as a CD ROM disc 46 as depicted in FIG. 5 or an insertable memory stick, which will perform aspects described herein when loaded into a portable device having suitable processing capabilities. The program code can also be downloaded remotely from a server either outside or inside the network 30 or be downloaded via a computer, such as a personal computer, to which the portable device is temporarily connected. In addition, the exemplary method described above refers to generating an MMS message with background media parts. It should be understood that aspects described herein are also applicable to electronic mail (e-mail) messages, instant messages (IMs) or any other communication from one device to another device.

The present invention has now been described with reference to exemplary embodiments. However, the invention is not limited to the embodiments described herein. On the contrary, the full extent of the invention is only determined by the scope of the appended claims and their equivalents.

The invention claimed is:

1. In a first portable communication device that is to communicate to a second portable communication device via a network, the first portable communication device including a communication arrangement and a message control unit, a method comprising:
   pulling, by a request from the first portable communication device, a background media portion from a network device in the network, where a content of the background media portion is selected, based on the request, from a plurality of background media, based on a current geographical location of the first portable communication device;
   generating a message that includes the background media portion; and
   sending the message from the first portable communication device to the second portable communication device via the network.

2. The method of claim 1, where the content of the background media portion is selected, from the plurality of background media, further based on a current geographical location of the second portable communication device.

3. The method of claim 1, further comprising:
   presenting, to a user of the first portable communication device, a plurality of network addresses for a plurality of network devices based on a characteristic of the message, where the plurality of network devices includes the network device; and
   receiving, from the user, a selection of the network address for the network device to send a request for the background media portion.

4. The method of claim 3, where the characteristic is a content of the message.

5. The method of claim 3, further comprising:
   providing a plurality of requests to a plurality of network devices, to a user of the first portable communication device, based on a content of the message generated by the first communication device,
   receiving a selection of one of the requests, and
   transmitting the selected request to the network device.

6. A portable communication device to communicate to another portable communication device via a network, the portable communication device comprising:
   a message control unit to:
   pull, by a request from the portable communication device, a background media portion from a network device in the network, where a content of the background media portion is selected, based on the request, from a plurality of background media, based on a current geographical location of the portable communication device, and generate a message that includes the background media portion, and a communication unit to send the message from the portable communication device to the other portable communication device via the network.

7. The communication device of claim 6, where the content of the background media portion is selected, from the plurality of background media, further based on a current geographical location of the other portable communication device.

8. The communication device of claim 6, where the message control unit is further to:

present, to a user of the portable communication device, a plurality of network addresses for a plurality of network devices based on a characteristic of the message, and receive, from the user, a selection of the network address for the network device to send a request for the background media portion.

9. The communication device of claim 8, where the characteristic is a content of the message.

10. The communication device of claim 6, where the message control unit is further to:

provide a plurality of requests to a plurality of network devices, to a user of the portable communication device, based on a content of the message generated by the portable communication device, receive a selection of one of the requests, and transmit the selected request to the network device.

11. A computer-readable storage device storing instructions, executable by at least one processor of a portable communication device, to cause the at least one processor to:

pull, by a request from the portable communication device, a background media portion from a network arrangement in a network, where a content of the background media portion is selected, based on the request, from a plurality of background media, based on a current geographical location of the portable communication device;

generate a message that includes the background media portion; and send, from the portable communication device, the message to the network arrangement for forwarding to a destination device.

12. A distribution system for transmitting, via a transmission medium, computer data signals representing device readable instructions for a method of sending a message from a first portable communication device to a second portable communication device via a network, the method comprising:

downloading, by a request from the first portable communication device and to the first portable communication device, a background media portion from a network arrangement in the network, where a content of the background media portion is selected, based on the request, from a plurality of background media, based on a current geographical location of the first portable communication device;

generating a message that includes the background media portion; and sending the message to the network arrangement for forwarding to the second portable communication device.

* * * * *